United States Patent
Joseph et al.

[19]

[11] Patent Number: 5,826,010
[45] Date of Patent: Oct. 20, 1998

[54] PREDEFINED ACCESS RIGHTS FOR UNDEFINED ATTRIBUTES IN A NAMING SERVICE

[75] Inventors: Brett Joseph, Northboro; Kathleen McConnell, Groton, both of Mass.

[73] Assignee: Banyan Systems, Inc., Westboro, Mass.

[21] Appl. No.: 600,413

[22] Filed: Feb. 12, 1996

[51] Int. Cl.$^6$ .................................................... G06F 11/00
[52] U.S. Cl. ................................................ 395/186; 707/9
[58] Field of Search ........................... 395/186, 187.01, 395/62; 707/9, 1

[56] References Cited

U.S. PATENT DOCUMENTS

| | | | |
|---|---|---|---|
| 4,621,321 | 11/1986 | Boebert et al. | |
| 5,287,500 | 2/1994 | Stoppani, Jr. | 395/601 |
| 5,315,657 | 5/1994 | Abadi et al. | 380/25 |
| 5,408,619 | 4/1995 | Oran | 395/280 |
| 5,603,031 | 2/1997 | White et al. | 395/683 |

OTHER PUBLICATIONS

Banyan Systems Incorporated; "Manufacturing VINES Users and StreetTalk," Table of Contents, Chapters 1,6, and 14, Order Number: 001556, Dec. 1992.

Banyan Systems Incorporated, "Planning a VINES Network," Table of Contents, Chapters 3 and 8, Order No.: 001907, Dec. 1992.

*Primary Examiner*—Albert Decady
*Attorney, Agent, or Firm*—Hale and Dorr LLP

[57] ABSTRACT

A network has a naming service with a storage device for maintaining names of objects and attributes relating to those objects. The attributes each have a numerical identification in an attribute space. The attribute space has a predetermined block of undefined attributes divided into groups, each of which has a different predefined combination of access protections relating to different categories of users and different types of access. When a new attribute is defined, it can be associated with one of the undefined attributes in the group having a desired combination access protection.

18 Claims, 2 Drawing Sheets

PREDEFINED ACCESS RIGHTS FOR UNDEFINED ATTRIBUTES IN A NAMING SERVICE

FIELD OF THE INVENTION

This invention relates to access rights for attributes to names in a naming service.

BACKGROUND OF THE INVENTION

Organizations from small firms to large international corporations use computer networks to interconnect workstations, servers, and host computers. In typical networks, servers are computers that connect the workstations to host computers and provide services, such as print, file, security, messaging, naming, and directory assistance. Each of these services can be considered to have hardware for processing and storing under control of software.

Referring to FIG. 1, an exemplary network with generally known interconnections has servers 10, 12, and 14 connected to groups of workstations 16, 18, and 20 and host computers 22, 24, and 26. A first LAN 28 is of the Ethernet-type, while a second LAN 30 and a third LAN 32 are each token rings. First server 10 and second server 12 are connected to each other over a switched line 34, while the second server 12 and third server 14 are connected over a backbone LAN 36. The servers can be directly connected to the host computers, or can be connected over switched networks. These different types of interconnections have various benefits and drawbacks, so they are chosen by network managers in response to the particular needs of the organization.

Such networks are run according to network operating system (NOS) software, an example of which is VINES® software available from Banyan Systems Inc. (VINES is a registered trademark of Banyan). The NOS software resides on the servers, such as exemplary server 14, which stores the NOS software on server disks 42 (NOS software also typically resides on the workstations). These disks also store other information, such as application programs and data files. One or more drives 44, such as cartridge tape drives, allow the network manager to install the NOS software and to provide high-speed backup of information on server disks 42. The server is run by a central processing unit (CPU) 46 that has memory that can be expanded with additional memory cards 48.

To make connections to other devices, the server has communications cards 50 including LAN cards for connecting workstations to servers, and servers to one another; it also has serial cards for connecting servers to other servers or to mainframes or minicomputers, either directly or through modems and phone lines. The serial cards can also be used for connection to printers 52, or the printer can be connected to a parallel printer port.

The CPU controls a number of services that are provided with the NOS software, including a global naming service (GNS) such as a StreetTalk™ naming service (StreetTalk is a trademark of Banyan Systems Inc.). The GNS is distributed among the servers in the network for keeping track of names of users and resources. Network administrators use the naming services to create and maintain databases of names and information about various resources. The naming services regularly share information to indicate changes to the other naming services. The distributed naming service thus maintains a complete and current view of resources available on the network, without the need for complex addressing schemes, and allows users to find resources by using natural and logical names that are consistent with the workplace. Users do not need to know where a resource is located; they only need to know a resource name.

In addition to names, the GNS also maintains attributes, which are pieces of information associated with StreetTalk objects, including users, printers, and lists. Each attribute can have a label that identifies the attribute, and a value for the attribute (although an attribute may have a label and not a value, or vice versa). The attributes are assigned values in the GNS's management programs or by applications or services.

The system is preferably provided with a number of predefined default attributes with labels such as address, phone number, country, and fax number for each user; or such as color capability, fonts, and location for each printer.

Each attribute is defined with a vendor-attribute number pair, expressed in the form <v:a>, such that each of v and a can range from 0 to $2^{32}-1$ (about 4.3 billion). These <v:a> numbers can be used by the users, and by independent software developers who develop programs and features for use with the naming service, such as a program for creating a corporate phone book.

In a previous version of the VINES NOS software, vendor no. 0 is reserved for attributes defined by Banyan and are in the default attribute display; vendor no. 1 is reserved for Banyan's internal use; vendor no. 2 is an unregulated number that third-party developers user to test new software before an official vendor number is assigned; and vendor no. 3 is recommended for customer-specific attributes. Vendor numbers from 4 to 4.3 billion are assigned to developers and particular customers, and should not be used by administrators.

The attributes can be defined with a combination of access protections for different categories of users who might want access. A user wanting access to an attribute relating to a certain object is defined as being in one of the following three categories: (1) administrator; (2) self; and (3) world. An administrator is a user who is one of a number of defined network administrators listed on lists of administrators for the object. "Self" relates to the object itself; for example, a user may want access to change an attribute that relates to his or her home address or phone number. A "world" user is anyone other than an administrator or self, such as a user who wants access to attributes relating to another user.

Attributes can be provided with a number of different types of access protection, preferably the abilities to read, write, and scan. Scan refers to the ability to confirm the existence of an attribute value, while read and write are self-explanatory.

In a previous edition of the VINES NOS, undefined attributes, i.e., attributes not associated with any label or value, were provided with a particular type of default protection; namely, self and administrator users had access to read, write, and scan, while the world had the ability to read and scan.

OBJECT AND SUMMARY OF THE INVENTION

It is an object of the present invention to provide groups of undefined attributes with predefined combinations of access protections to give administrators and developers convenient flexibility in associating access protections with attributes and to provide greater security for developers of applications.

According to the present invention, a vendor-attribute space has a large number of attributes that are undefined in that they are not associated with any label or value. Of these undefined vendor attribute numbers, a number is set aside and divided into groups. Each of these groups has a different combination of predefined access protections for different categories of users and different types of access.

The block of vendor-attribute numbers that is set aside is preferably very large in absolute terms, e.g., about 500,000 attributes for each vendor number, but is relatively very small compared to the total number of attribute numbers, which is preferably about 4.3 billion numbers per vendor number. The number of groups of access protections is a subset of all possible different types of access, i.e., scan, read, and write, and different categories of users, i.e., administrator, self, and world, and preferably consists of about 30 different groups and combinations. For each group, the number of vendor-attribute numbers per vendor is preferably about 10,000.

By providing predefined access protections for undefined attribute numbers, developers can conveniently and reliably associate attributes with such predefined access protections that are guaranteed to be unchanged. Simply by looking at the attribute number, others can determine the combination of access protections associated with that attribute. Other features and advantages will become apparent from the following detail description, the claims, and the drawings.

DETAILED DESCRIPTION

Figure 1:
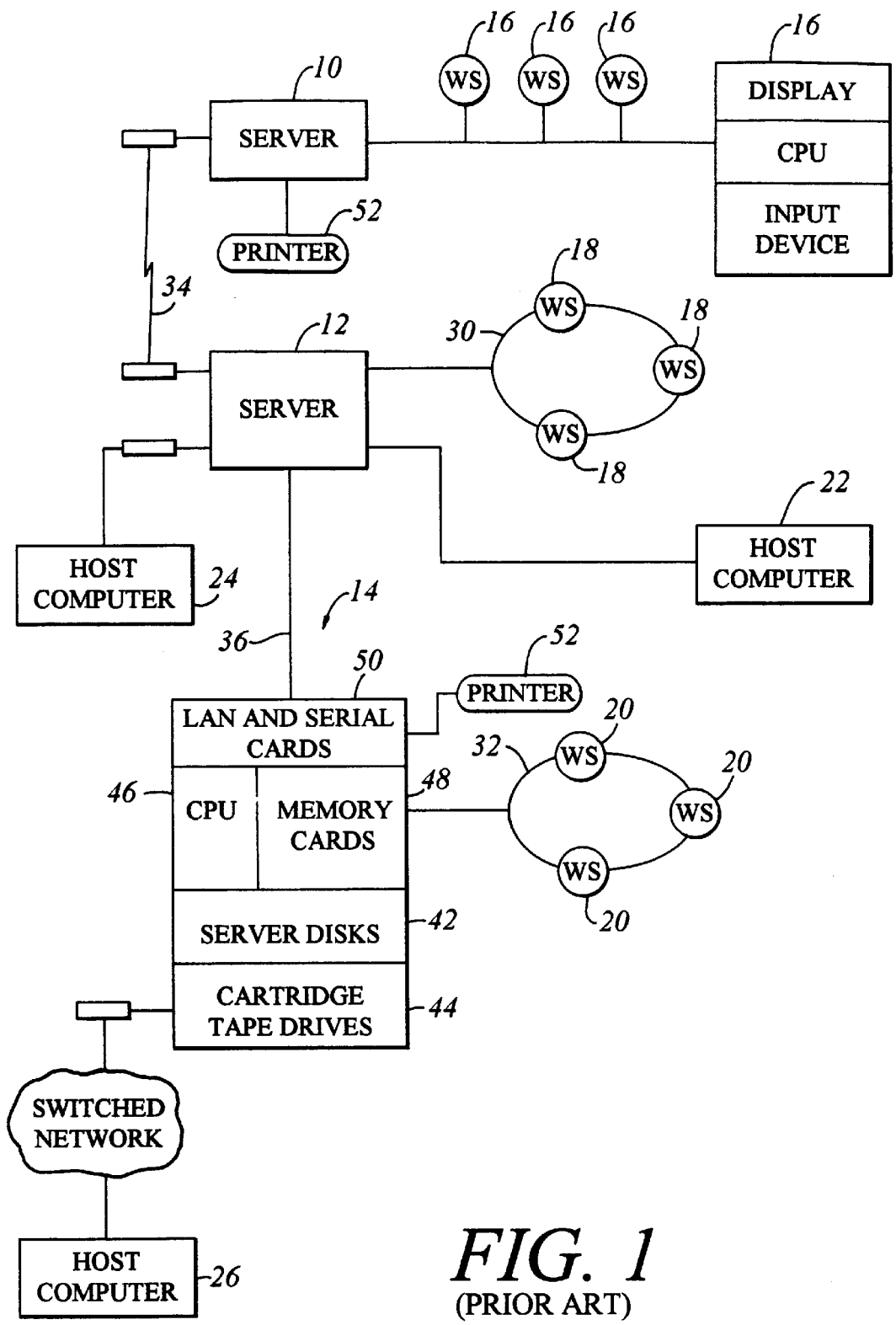
FIG. 1 is a block diagram of an exemplary network made up of known topologies.
Figure 2:
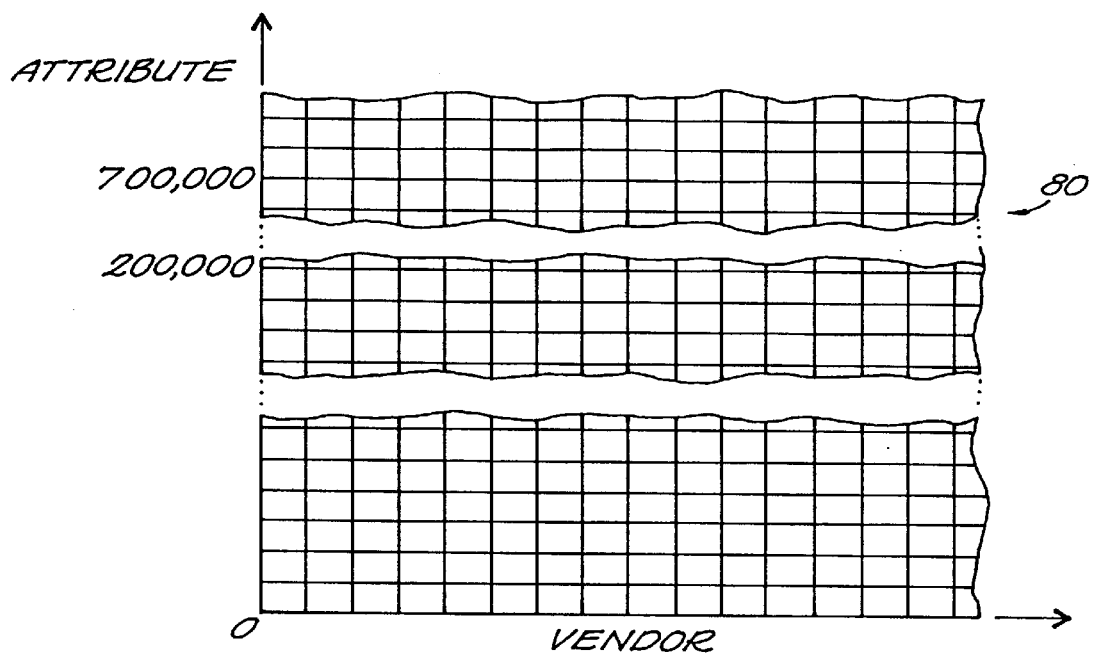
FIG. 2 is a graph of a <v:a> space according to the present invention.

Referring to FIG. 2, a vendor-attribute (<v:a>) space has vendor and attribute numbers, each of which preferably ranges from 0 to about 4.3 billion, for a total attribute space of about 17 quintillion pairs. As in prior systems, some of these attributes have predefined default labels, such as "home phone number," which takes a phone number as its value, and which has a certain combination of access protections. Most of the attribute numbers are undefined, however, in that they have no label and no value, but have a particular default combination of access protections, namely scan, read, and write protection for self and administrators, and scan and read access for world users.

According to the present invention, out of this vendor-attribute space, a block 80 of <v:a> numbers is set aside with a number of different combinations of access protections that are different from the default combination of access protections. In the exemplary embodiment, block 80 is a band that extends along the vendor axis, such that for every vendor number, it includes attributes numbers from 200,000 to 700,000.

These attribute numbers are divided into a number of different groups, each of which has a different predefined combination of access protections. Because there are three possible types of access (i.e., scan, read, and write), and users are in one of three access protection categories (i.e., self, administrator, and world), each category of user can theoretically have one of $2^3=8$ combinations of protections, and therefore there could be a total of $8^3=512$ overall combinations of access protections. This large number of combinations can be reduced to a much smaller number, however, by discarding illogical combinations; for example, it would not make sense to allow world users to have more access to an attribute than a self user or an administrator has, and it makes no sense to give read access without scan access. It may be useful in certain defined situations for a self user to have greater protection than an administrator; for example, a user may be able to read, scan, and write a password, while an administrator may be able to scan, and perhaps write, but not read.

According to the present invention, the number of different groups with different predefined combinations of access protections has been set to 30 (not counting a group of numbers set-aside for future expansion). The protections for self, administrator, and world, along with an exemplary range of attribute numbers are shown below in Table I, where s=scan, r=read, and w=write.

TABLE I

| SELF | ADMIN | WORLD | RANGE |
| --- | --- | --- | --- |
| srw | srw | srw | 200,000–209,999 |
| srw | srw | sr | 210,000–219,999 |
| srw | srw | sw | 220,000–229,999 |
| srw | srw | s | 230,000–239,999 |
| srw | srw | w | 240,000–249,999 |
| srw | srw | — | 250,000–259,999 |
| srw | sr | sr | 260,000–269,999 |
| srw | sr | s | 270,000–279,999 |
| srw | sr | — | 280,000–289,999 |
| srw | sw | sw | 290,000–299,999 |
| srw | sw | s | 300,000–309,999 |
| srw | sw | w | 310,000–319,999 |
| srw | sw | — | 320,000–329,999 |
| srw | s | s | 330,000–339,999 |
| srw | s | — | 340,000–349,999 |
| srw | w | w | 350,000–359,999 |
| srw | w | — | 360,000–369,999 |
| srw | — | — | 370,000–379,999 |
| sr | srw | sr | 380,000–389,999 |
| sr | srw | s | 390,000–399,999 |
| sr | srw | — | 400,000–409,999 |
| sw | srw | sw | 410,000–419,999 |
| sw | srw | s | 420,000–429,999 |
| sw | srw | w | 430,000–439,999 |
| sw | srw | — | 440,000–449,999 |
| s | srw | s | 450,000–459,999 |
| s | srw | — | 460,000–469,999 |
| w | srw | w | 470,000–479,999 |
| w | srw | — | 480,000–489,999 |
| — | srw | — | 490,000–499,999 |
| * | * | * | 500,000–700,000 |

Accordingly, in the exemplary embodiment, for each vendor number, there are 500,000 attribute numbers, and about 30 groups, so that there are about 10,000 undefined attributes per group. As shown in Table I, about 200,000 attribute numbers (500,000–700,000) are set aside for expansion to other combinations of access protections. This set aside block of vendor-attribute numbers thus provides developers with many attributes with many different predefined combinations of access protections.

When a developer or an administrator needs to define a new attribute that has a certain desired combination of access protections that is different from the default protections, the developer can look up the desired combination of access protections to find the corresponding range of attribute numbers. The developer can then assign the new attribute to one of the numbers in the appropriate range of attribute numbers. For example, a password for a certain application might be assigned an attribute in the range of 340,000–349,999 so that a user can scan, read, and write his or her password, and an administrator can only confirm its existence.

For those who develop software applications for use with this network software, this predefined space of access protections can provide security about protections, because these protections cannot be changed.

These vendor-attribute numbers and the labels and values of the attributes are stored in a storage device, such as a disk, tape, or RAM, either in a server or in a host computer, and are part of, or at least accessible to, the naming service. As noted above, a naming service generally includes at least a combination of software and implementing processing hardware, typically with other storage and interfaces.

Figure 3:
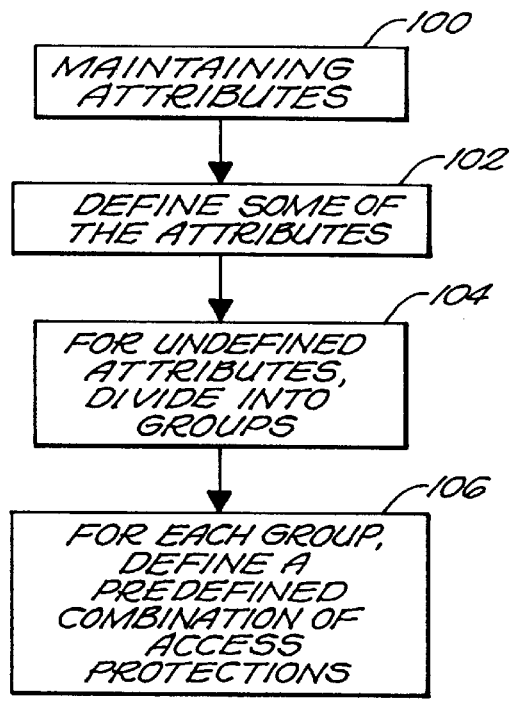
FIG. 3 is a flow-chart illustrating a method according to the present invention.

FIG. 3 illustrates a method according to the present invention. This method includes maintaining attributes for association with objects in the network (100). Some of the attributes to be associated with objects in the network are defined (102). For a number of the undefined attributes, the undefined attributes are divided into groups (104). For each of these groups, a different predefined combination of access protections is defined with respect to different categories of users and different types of access (106). According to this method, the categories of users preferably include administrator, self, and world; and the types of access include scan, read, and write.

Having described preferred embodiments of the present invention, it should be apparent that other modifications can be made without departing from the scope of the appended claims. While the vendor-attribute numbers are defined in a two-dimensional space, the space of vendor-attribute numbers can be in any number of dimensions.

We claim:

1. A network including a server with a naming service for maintaining names of objects and including storage for maintaining attributes for association with objects in the network, wherein some of the attributes are undefined in that the undefined attributes are not associated with any object and others are defined and associated with objects, a number of the undefined attributes being divided into predetermined groups, each of which has a different predefined combination of access protections for different categories of users and different types of access, such that when a new attribute is to be defined with a certain desired combination of access protections, that new attribute can be associated with one of the undefined attributes in the particular group having the desired combination of access protections.

2. The network of claim 1, wherein the categories of users includes administrator, self, and world.

3. The network of claim 2, wherein the types of access include scan, read, and write.

4. The network of claim 1, wherein the types of access include scan, read, and write.

5. The network of claim 1, wherein the objects include users and printers in the network.

6. The network of claim 1, wherein the attributes are uniquely identified by two numbers.

7. A storage device for maintaining attributes for association with objects in a network system, wherein some of the attributes are undefined in that the undefined attributes are not associated with any object and others are defined and associated with objects, a number of the undefined attributes being divided into groups, each of which has a different predefined combination of access protections with respect to different categories of users and different types of access.

8. The storage device of claim 7, wherein the categories of users includes administrator, self, and world.

9. The storage device of claim 7, wherein the types of access include scan, read, and write.

10. The network of claim 7, wherein the objects include users and printers in the network.

11. The network of claim 7, wherein the attributes are uniquely identified by two numbers.

12. A method for use with a network having a naming service with access to a storage device, the method comprising:

(a) maintaining attributes for association with objects in the network in the storage device;

(b) defining some of the attributes to be associated with objects in the network;

(c) for a number of the undefined attributes not associated with objects, dividing the undefined attributes into groups; and (d) defining, for each of the groups, a different predefined combination of access protections with respect to different categories of users and different types of access.

13. The method of claim 12, wherein step (c) includes dividing the undefined attributes into groups of 10,000 attributes.

14. The method of claim 12, wherein the categories of users includes administrator, self, and world.

15. The method of claim 12, wherein the types of access includes scan, read, and write.

16. The method of claim 12, where step (c) includes dividing a number of undefined attributes into at least about 30 groups.

17. The method of claim 12, wherein the objects include users and printers in the network.

18. The method of claim 12, wherein the attributes are uniquely identified by two numbers.

* * * * *